(12) United States Patent
Crambert et al.

(10) Patent No.: US 8,660,126 B2
(45) Date of Patent: Feb. 25, 2014

(54) METHOD AND SYSTEM FOR AUTOMATIC SELECTION OF TRANSMISSION MEDIA

(75) Inventors: Philippe Crambert, Colombes (FR); Alain Malice, Bougival (FR)

(73) Assignee: Thales, Neuilly sur Seine (FR)

( * ) Notice: Subject to any disclaimer, the term of this patent is extended or adjusted under 35 U.S.C. 154(b) by 158 days.

(21) Appl. No.: 13/387,902

(22) PCT Filed: Jul. 26, 2010

(86) PCT No.: PCT/EP2010/060782
§ 371 (c)(1),
(2), (4) Date: Apr. 3, 2012

(87) PCT Pub. No.: WO2011/012569
PCT Pub. Date: Feb. 3, 2011

(65) Prior Publication Data
US 2012/0189005 A1     Jul. 26, 2012

(30) Foreign Application Priority Data
Jul. 31, 2009  (FR) ..................................... 09 03791

(51) Int. Cl.
*H04L 12/28* (2006.01)
(52) U.S. Cl.
USPC ............ 370/392; 370/238; 370/351; 370/389

(58) Field of Classification Search
USPC .................. 370/238, 351, 389, 392; 709/241
See application file for complete search history.

(56) References Cited

U.S. PATENT DOCUMENTS

| | | | |
|---|---|---|---|
| 6,701,375 B1* | 3/2004 | Walker et al. ................ | 709/243 |
| 7,668,167 B2 | 2/2010 | Jacquet et al. | |
| 2001/0007550 A1* | 7/2001 | Phan et al. .................... | 370/216 |
| 2003/0206528 A1 | 11/2003 | Lingafelt et al. | |
| 2005/0286452 A1 | 12/2005 | Hardgrave et al. | |
| 2010/0293292 A1 | 11/2010 | Tamalet et al. | |

FOREIGN PATENT DOCUMENTS

| | | | |
|---|---|---|---|
| EP | 1583287 A1 | 10/2005 | |
| FR | 2922397 A1 | 4/2009 | |
| WO | 99/33232 A2 | 7/1999 | |

* cited by examiner

*Primary Examiner* — Hassan Kizou
*Assistant Examiner* — Ashil Farahmand
(74) *Attorney, Agent, or Firm* — Baker Hostetler LLP

(57) ABSTRACT

A method for the selection of transmission media in a communication infrastructure comprises at least the following steps: applying at least one routing rule so as to select the medium over which to transmit the packet, if no routing rule is applicable to said packet, selecting the medium over which to transmit said packet with the aid of a routing table, updating said routing table with the aid of a routing protocol and of a function for computing the routing cost of each medium, applying at least one quality-of-service management rule to said packet by means of filtering.

7 Claims, 3 Drawing Sheets

METHOD AND SYSTEM FOR AUTOMATIC SELECTION OF TRANSMISSION MEDIA

CROSS-REFERENCE TO RELATED APPLICATIONS

This application is a National Stage of International patent application PCT/EP2010/060782, filed on Jul. 26, 2010, which claims priority to foreign French patent application No. FR 0903791, filed on Jul. 31, 2009, the disclosures of which are incorporated by reference in their entirety.

FIELD OF THE INVENTION

The present invention relates to a method for the selection of transmission media within an infrastructure comprising at least one wire network using the IP (Internet Protocol) protocol and a plurality of communication systems having varied characteristics, notably in terms of data rate and latency. It also relates to the system using this method.

The invention applies, for example, in the naval field in which the communication requirements are numerous because of the considerable number of people that may be on board a ship. Moreover, a ship makes it possible to have numerous different wireless communication systems because the space requirement therein is less critical than on land or air vehicles.

BACKGROUND

When several wireless communication systems are available, such as High Frequency (HF) transmission systems, Ultra High Frequency (UHF), satellite transmission systems or microwave high data rate transmission systems such as the WIMAX (Worldwide Interoperability for Microwave Access) system, the problem arises of the selection of a communication link for conveying the data packets that it is desired to transmit to this link. Specifically, these various systems have specific characteristics and the communication requirements, notably in terms of data rate and of quality of service, may differ depending on the user or the type of messages transmitted. For a given application, for example a video conferencing, audio conferencing or electronic mail application, the data rate requirements and the constraints concerning latency of the transmission are not the same. Intrinsically, the transmission of video content requires a higher data rate than that necessary for simply sending text messages. Similarly, a conversational application will require a low latency unlike an application for broadcasting audio or video content.

For these reasons, it is important to use an automatic method for selecting the medium most suitable for the requirements of the user and also taking account of the availability of each medium which may be congested by an application using the whole data rate resource available or suffering interference from difficult propagation conditions.

One of the problems that the invention seeks to solve is to make automatic the selection of the type of transmission medium as a function of the communication requirements. In the naval context, a known solution consists in using a human decision, by means of a radio operator, to take the decision. In practice, this radio operator configures a matrix of connections which link, at a given moment, a user to the transmission medium that is most operational and that best satisfies the requirements of the user.

This solution has the major drawback of being not very effective because it is not automatic and requires a constant updating of circuits which link the terminals to each wireless communication system.

Other solutions for the automatic routing of the transmitted packets exist but they do not take account of the characteristics of each communication system and of each transmission medium in order to offer the best performance in terms of quality of service for a user and a given application.

In the rest of the description, the term transmission medium is used to designate the physical link between the source and the destination of a packet and more particularly a wireless link. The terms transmission systems and communication resources designate the items of transceiver equipment used to transmit data over a transmission medium.

The present invention proposes a solution of automatic selection of the most appropriate communication resources as a function of various criteria such as the type of application, the type of user, the availability of the transmission medium, its data rate and its latency.

A notable advantage of the invention is that it makes it possible to exploit all the available communication resources and to distribute them in the best way depending on the requirements and the priorities. It also allows compatibility with the network architectures based on the IP (Internet Protocol) communication protocol.

SUMMARY OR THE INVENTION

Accordingly, the subject of the invention is a method for the automatic selection of transmission media in a communication infrastructure comprising at least one local network through which a plurality of applications communicate, a router and a plurality of communication systems allowing said applications to communicate over said transmission media by sending data packets, said method being characterized in that it comprises at least the following steps:

applying at least one routing rule so as to select the medium over which to transmit said packet as a function of at least one criterion amongst the following: the application type, the size or the source address of said packet, if no routing rule is applicable to said packet, selecting the medium over which to transmit said packet with the aid of a routing table containing, for each communication system available within said infrastructure, a value of cost of said associated transmission medium, the selected medium being that which has the lowest routing cost, updating said routing table with the aid of a routing protocol and of a function for computing the routing cost of each medium so that said cost has a value that is inversely proportional to the transmission data rate available on said medium, proportional to the transmission latency over said medium, said routing protocol (305, 306) being a static routing protocol (305) for a transmission data rate available on said medium (301, 302, 303) that is below a given data rate D threshold value (304) and a dynamic routing protocol (306) in the contrary case, applying at least one quality-of-service management rule to said packet by means of filtering of which the function is to delete said packet if the characteristics of said medium do not make it possible to ensure the correct operation of the application associated with said packet.

In one variant embodiment of the invention, said data rate D threshold value is equal to 64 kilobits per second.

In one variant embodiment of the invention, said local network is an IP network and said data packets conform to the IP protocol.

In one variant embodiment of the invention, said dynamic routing protocol is the OSPF protocol.

In one variant embodiment of the invention, said communication systems are chosen from the following systems: a High Frequency (HF) transmission system, an Ultra High Frequency (UHF) transmission system, a satellite transmission system and/or a WIMAX wireless communication system.

A further subject of the invention is a transmission system comprising at least one local network through which a plurality of applications communicate, a router and a plurality of communication systems allowing said applications to communicate over said transmission media by sending data packets, said system being characterized in that said router comprises means for executing the steps of the transmission-medium selection method described above.

A further subject of the invention is a use of the method described above for an infrastructure on board a ship.

BRIEF DESCRIPTION OF THE DRAWINGS

Other features will appear on reading the detailed description given as an example and not being limiting, as follows, made with respect to the appended drawings which represent.

DETAILED DESCRIPTION

Figure 1:
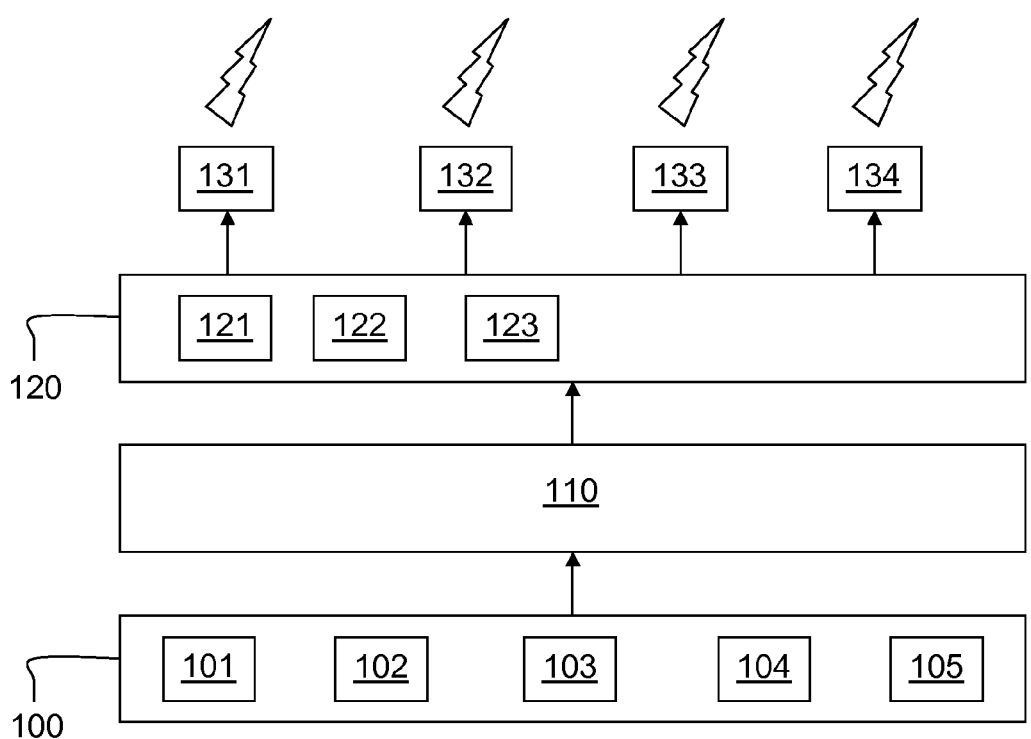
FIG. 1, a diagram describing an exemplary architecture of a system using the selection method according to the invention, FIG. 2, a diagram schematizing the steps of the automatic selection method according to the invention, FIG. 3, a diagram illustrating a scenario of application of the selection method in a naval context.

FIG. 1 represents an exemplary architecture of a system using the method for selecting transmission media according to the invention. This architecture comprises notably an application layer 100 which uses various communication applications, for example a video conference application 101, an audio conference application 102, an electronic mail application 103, an application 104 making it possible to access an internet page via the http protocol or else an instantaneous messaging application 105. The application layer 100 is connected to a local network 110 of the IP (Internet Protocol) type itself connected to a router 120. The router 120 comprises at least one quality-of-service management module 121 and a module 122 of the PBR for "Policy-Based Routing" type the function of which is to take decisions on routing based on criteria outside the network itself. Finally, a router 120 also comprises a module 123 for selecting the transmission medium according to the invention; this module makes it possible to direct the data packets transmitted at the application layer 100 to one of the available transmitters that implement a different type of transmission. The possible communication systems are for example a High Frequency (HF) transmission system 131, an Ultra High Frequency (UHF) transmission system 132, a satellite transmission system 133 or else a wireless communication system of the WIMAX (Worldwide Interoperability for Microwave Access) type.

Figure 2:
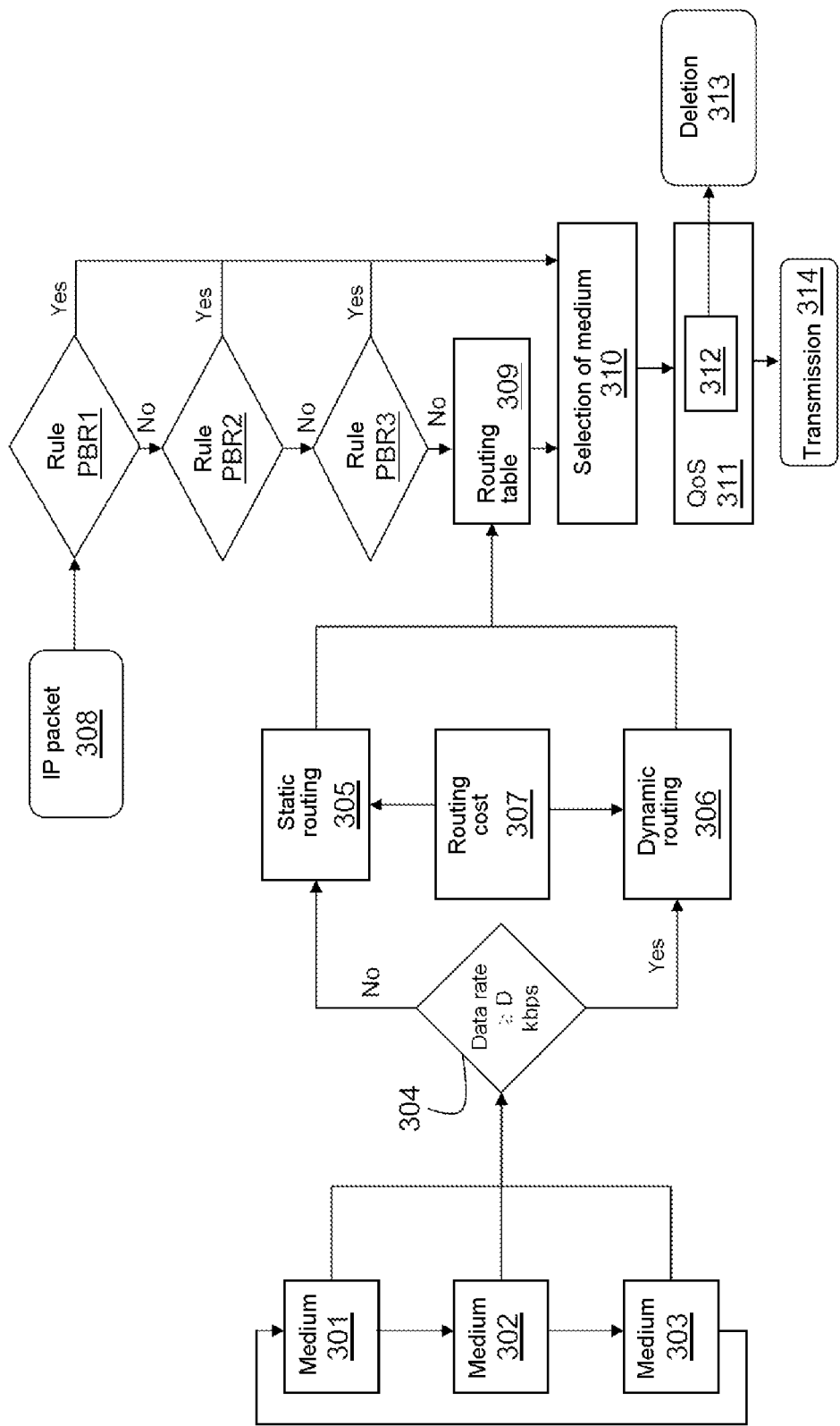

FIG. 2 schematizes a diagram of the sequencing of the steps for applying the method according to the invention. A notable object of the invention is to select the type of transmission medium 131, 132, 133, 134 for each data packet, for example an IP packet, to be transmitted. An IP packet 308, characterized notably by the type of transport protocol that it conveys, its size and the source and destination addresses of the message that it contains is subjected to a succession of tests for the applicability of routing rules and/or of processing PBR1, PBR2, PBR3. These rules are based on the known routing technique "Policy-Based Routing". This technique makes it possible to route packets not only on the basis of their destination, as is the case conventionally in routing problems, but also on the basis of other criteria such as the type of application contained in the packet 308, its size or its source address. Several rules PBR1, PBR2, PBR3 may be implemented by giving them an increasing priority. If rule PBR1 is applicable to the IP packet 308, the latter is transmitted to a module 310 for selecting the transmission medium according to the invention. In the contrary case, the IP packet 308 is subjected to a second rule PBR2 and so on until the list of available rules is used up.

If none of the rules PBR1, PBR2, PBR3 is applicable to the IP packet 308, it is routed to its destination by virtue of the information contained in a routing table 309 which then indicates to the selection module 310 which transmission system is chosen for transmitting the IP packet 308.

Once the transmission medium has been selected, a final module 311 for managing the quality of service or QoS ensures a sufficient transmission quality for certain types of applications. This module carries out filtering 312 of the received IP packet 308 which may culminate in its deletion 313 if the medium selected for transmitting this packet does not have sufficient characteristics for a transmission of the data contained in this packet with a minimum quality. For example, a videoconference application requires a minimum transmission data rate to ensure correct operation of the communication. Accordingly, an HF transmission system, which intrinsically has a low transmission data rate, of the order of a few kilobits per second, is not sufficient for transmitting video content. If the IP packet 308 is not filtered by the quality-of-service management module 311, it is then transmitted 314 over the medium previously selected by the module 310.

The routing table 309 is updated for each available type of transmission medium 301, 302, 303 in order to configure the protocol for routing the transmitted packets according to the characteristics of each medium. The available communication systems are classified relative to one another by specifying a weight on each route contained in the routing table 309. The transmission data rate is taken into account and compared with a threshold value D during a test step 304. A characteristic value of D is 64 kilobits per second because below this data rate it is not desirable to use a dynamic routing protocol which requires a considerable signaling flow unlike static routing. If the available data rate is strictly below D, a static routing 305 is then applied to update the routing table. In the contrary case, a dynamic routing protocol 306 is used, for example the protocol known as OSPF (Open Shortest Path First). This dynamic routing protocol 306 is adapted as a function of the transmission medium 301, 302, 303. In particular polling messages are used to update the relative weight of each path and to detect, for example, a loss of availability of a transmission medium. The function of these messages is to poll a given route in order to verify that it is accessible. They are transmitted periodically with a time gap between two messages which depends on the available data rate. This polling gap is adapted as a function of the data rate supported by each communication medium so as to prevent excessive occupancy of the bandwidth by the messages transmitted by the routing protocol.

The dynamic routing protocol 306 is configured with the aid of a function 307 for computing the routing cost of the transmission medium. This function computes a weight associated with each medium according to various criteria, notably the available data rate, the transmission latency and the price if access to a medium requires a subscription. The computation 307 of the routing cost is also carried out for static routing by assigning the highest cost for this case. The routing table 309 is then updated for each transmission medium 301, 302, 303 with the information originating from the two routing protocols 305, 306 that are used. This table 309 contains, for each route connecting a source to a destination within a network considered, a metric for classifying the various possible routes according to their previously determined cost.

Figure 3:
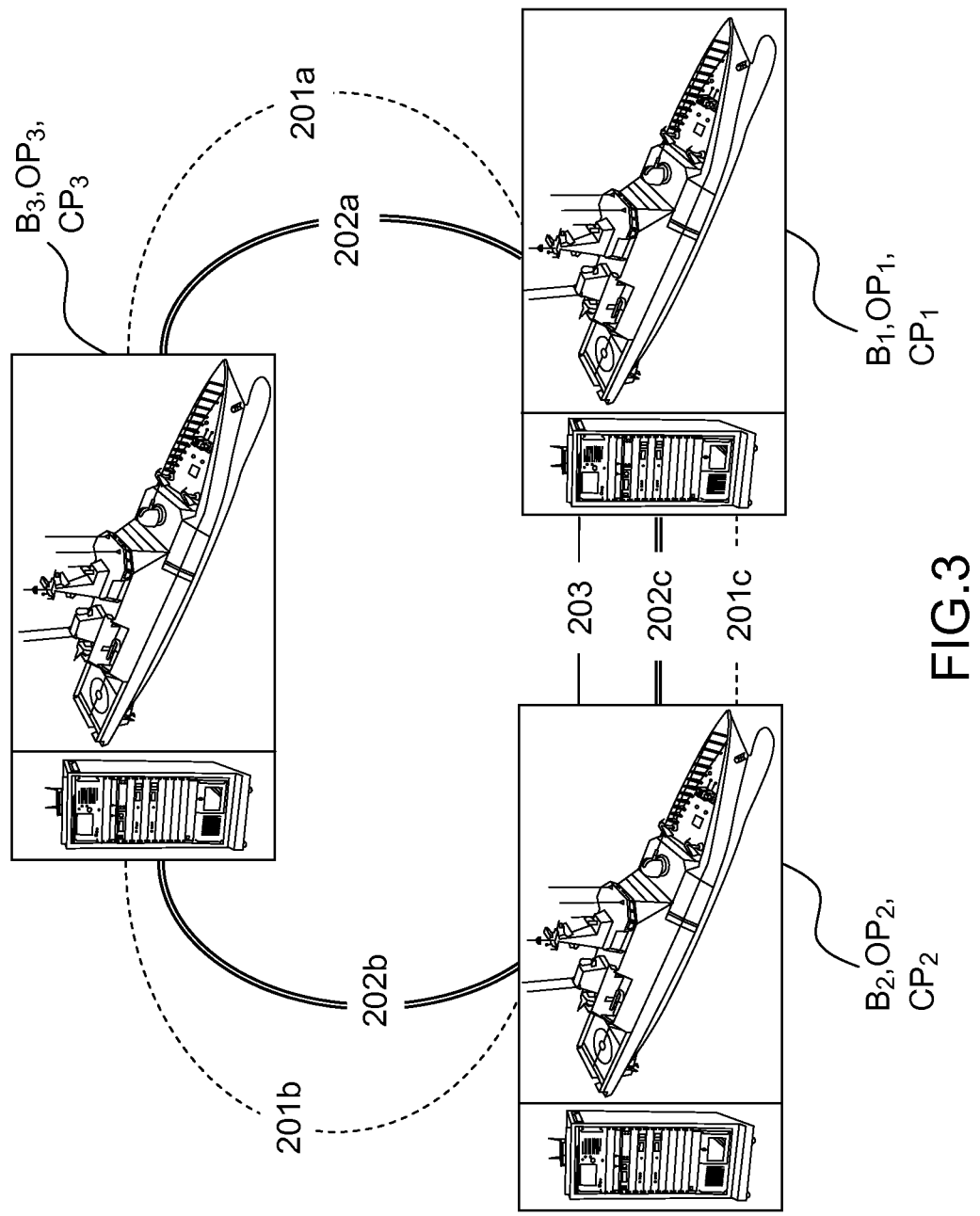

FIG. 3 illustrates an example of application of the method according to the invention in a naval context. This example is in no way limiting and its purpose is to illustrate the application of the invention through practical application scenarios.

Three ships B1, B2, B3 communicate with one another via several wireless transmission means. The three ships B1, B2, B3 are each fitted with a High Frequency (HF) link 201a, 201b, 201c and with an Ultra High Frequency (UHF) link 202a, 202b, 202c. Two of the three ships, B1 and B2, are also fitted with satellite communication systems 203 via which they can also communicate. Each of the ships has on board two users having access to the communication resources. A first user is an operator OP1, OP2, OP3 and a second user, with higher priority than the first, is for example the captain of the ship, CP1, CP2, CP3.

The selection method according to the invention is applied to each ship by taking account of two rules PBR by increasing priority. The first rule PBR1 consists in directing all the packets transporting an instantaneous messaging application to the HF link. The second rule PBR2 consists in directing all the packets from the source address allocated to the captain of the ship to the satellite link because the latter has a better response time.

The function 307 for computing the routing cost according to the invention classifies the three types of communication systems available according to several criteria. The lowest medium cost is assigned to the UHF link 202a, 202b, 202c because it provides a considerable transmission data rate and no-cost access. An intermediate medium cost is assigned to the satellite link 203 because, although providing the best data rate, it has access that has to be paid for, a financial criteria may also, in this respect, be taken into account in computing the routing cost. Finally, a high medium cost is associated with the HF link 201a, 201b, 201c because this link provides the lowest data rate.

Finally, a quality-of-service rule QoS1 is used to configure the quality-of-service management module 311. This rule consists in forbidding the HF link, which has too low a data rate, for the transmissions of video content such as a video-conference.

Several application scenarios may be envisaged. In a first scenario, the operator OP1 situated on the ship B1 communicates with the operator OP3 situated on the ship B3 via an instantaneous messaging application. Connectivity is possible via an HF link 201a or via a UHF link 202a. The method according to the invention is applied according to the steps described using FIG. 2. The rule PBR1 is applicable to the transmitted packets that are directed to the HF transmission system of the ship B1 even though the routing rules indicate a lower routing cost for the UHF link. Accordingly, the rule PBR1 has priority. No quality-of-service management rule is applicable in this case, so the packets are transmitted to their destination via the HF link 201a.

In a second scenario, the operator OP1 consults a web page situated on a server hosted by an item of equipment used by the operator OP2 situated on the ship B2. The three links 201c, 202c, 203 are available and allow connectivity, so the session begins by using the UHF link 202c which is the lowest cost link according to the routing table 309. The captain CP1 wishes to access the same server situated on B2; the method according to the invention then allocates to him the satellite resource 203 by applying the rule PBR2.

In a third scenario, the two ships B1 and B2 move away from one another so that UHF connectivity is no longer provided. The method according to the invention then conveys the communication between the operator OP1 and the operator OP2, established during the second scenario, to the satellite link according to the established routing rules. The link between the captain CP1 and the operator OP2 remains unchanged.

In a fourth scenario, there is a satellite equipment failure on the ship B2, so the corresponding link 203 is no longer available. Moreover, the ships B1 and B2 are still too far away to be able to reestablish UHF connectivity. In this case, the routing rules involve use of the only link still available, the HF link 201a.

In a fifth scenario, the captain CP1 wishes to have a video-conference with his opposite number CP3. The only available link between the two ships B1 and B3 is the HF link 201a, but it is not compatible with a video transmission. The quality-of-service management module 311 deletes the transmitted packets so as to prevent the transfer of this flow according to the quality-of-service rule QoS1.

The invention claimed is:

1. A method for the automatic selection of transmission media in a communication infrastructure comprising at least one local network through which a plurality of applications communicate, a router and a plurality of communication systems allowing said applications to communicate over said transmission media by sending data packets, said method comprising at least the following steps:
applying at least one routing rule so as to select the medium over which to transmit said packet as a function of at least one criterion amongst the following: an application type, a size or a source address of said packet,
if no routing rule is applicable to said packet, selecting the medium over which to transmit said packet with the aid of a routing table containing, for each communication system available within said infrastructure, a value of cost of said associated transmission medium, the selected medium being that which has the lowest routing cost,
updating said routing table with the aid of a routing protocol and of a function for computing the routing cost of each medium so that said cost has a value that is inversely proportional to the transmission data rate available on said medium, proportional to the transmission latency over said medium, said routing protocol being a static routing protocol for a transmission data rate available on said medium that is below a given data rate D threshold value and a dynamic routing protocol in the contrary case,
applying at least one quality-of-service management rule to said packet by means of filtering of which the function is to delete said packet if the characteristics of said medium do not make it possible to ensure the correct operation of the application associated with said packet.

2. The method as claimed in claim 1, wherein said data rate D threshold value is equal to 64 kilobits per second.

3. The method as claimed in claim 1, wherein said local network is an IP network and said data packets conform to the IP protocol.

4. The method as claimed in claim 1, wherein said dynamic routing protocol is the OSPF protocol.

5. The method as claimed in claim 1, wherein said communication systems are chosen from the following systems: a High Frequency (HF) transmission system, an Ultra High Frequency (UHF) transmission system, a satellite transmission system and/or a WIMAX wireless communication system.

6. A transmission system comprising at least one local network through which a plurality of applications communicate, a router and a plurality of communication systems allowing said applications to communicate over said transmission media by sending data packets, wherein said router comprises means for executing the steps of the transmission-medium selection method as claimed in claim 1.

7. Use of the method as claimed in claim 1 for an infrastructure on board a ship.

* * * * *

UNITED STATES PATENT AND TRADEMARK OFFICE
CERTIFICATE OF CORRECTION

PATENT NO. : 8,660,126 B2  Page 1 of 1
APPLICATION NO. : 13/387902
DATED : February 25, 2014
INVENTOR(S) : Crambert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 222 days.

Signed and Sealed this

Twenty-ninth Day of September, 2015

Michelle K. Lee
*Director of the United States Patent and Trademark Office*